US008768821B1

(12) United States Patent
Elston (10) Patent No.: US 8,768,821 B1
(45) Date of Patent: Jul. 1, 2014

(54) COMPUTER-IMPLEMENTED SYSTEM AND METHOD FOR PROVIDING SUMMARIZATION OF SPREAD AND VOLUME FOR SECURITIES ORDER BOOKS

(76) Inventor: Stephen Frederic Elston, Seattle, WA (US)

( * ) Notice: Subject to any disclaimer, the term of this patent is extended or adjusted under 35 U.S.C. 154(b) by 21 days.

(21) Appl. No.: 13/277,176

(22) Filed: Oct. 19, 2011

(51) Int. Cl.
*G06Q 40/00* (2012.01)

(52) U.S. Cl.
USPC .......................................................... 705/37

(58) Field of Classification Search
CPC ............................... G06Q 40/04; G06Q 40/00
USPC ..................................................... 705/35–45
See application file for complete search history.

(56) References Cited

U.S. PATENT DOCUMENTS

| | | | | |
|---|---|---|---|---|
| 6,408,282 | B1* | 6/2002 | Buist ............................ | 705/36 R |
| 7,212,999 | B2* | 5/2007 | Friesen et al. ................... | 705/37 |
| 7,539,638 | B1* | 5/2009 | Keith ............................... | 705/37 |
| 7,617,149 | B2* | 11/2009 | Rosenthal et al. .............. | 705/37 |
| 7,624,064 | B2* | 11/2009 | Rosenthal et al. .............. | 705/37 |
| 7,720,742 | B1* | 5/2010 | Mauro et al. ..................... | 705/37 |
| 7,895,118 | B2* | 2/2011 | Glodjo et al. .................... | 705/38 |
| 8,024,247 | B2* | 9/2011 | Burkhardt et al. ........... | 705/36 R |
| 8,060,434 | B1* | 11/2011 | Mauro et al. ..................... | 705/37 |
| 8,140,416 | B2* | 3/2012 | Borkovec et al. ............... | 705/35 |
| 8,175,955 | B2* | 5/2012 | Friesen et al. ................... | 705/37 |
| 8,185,467 | B2* | 5/2012 | Friesen et al. ................... | 705/37 |
| 8,374,952 | B2* | 2/2013 | Friesen et al. ................... | 705/37 |
| 8,620,759 | B1* | 12/2013 | Virgilio et al. ................ | 705/26.1 |
| 2005/0234790 | A1* | 10/2005 | Newport .......................... | 705/35 |
| 2006/0253377 | A1 | 11/2006 | Burns et al. | |
| 2007/0038543 | A1 | 2/2007 | Weinstein | |
| 2007/0150407 | A1 | 6/2007 | Gilboy | |
| 2007/0294162 | A1* | 12/2007 | Borkovec ......................... | 705/37 |
| 2008/0086401 | A1* | 4/2008 | Mather ............................ | 705/35 |
| 2008/0115079 | A1* | 5/2008 | Mather ........................... | 715/774 |
| 2009/0076978 | A1* | 3/2009 | Dayan .......................... | 705/36 R |
| 2009/0259598 | A1* | 10/2009 | Stevens et al. .............. | 705/36 R |
| 2010/0094745 | A1* | 4/2010 | Peterffy .......................... | 705/37 |
| 2012/0084191 | A1* | 4/2012 | Mintz ............................. | 705/37 |

OTHER PUBLICATIONS

Malik, Azeem; Wing Lon Ng, "Detecting Diurnal Volume Profile: An Emperical Analysis of Market Depth", International Economic Society: Banking and Finance Letters, 2009, vol. 1, Issue 3, pp. 119-128.*

(Continued)

*Primary Examiner* — Mohammad Z Shaikh
(74) *Attorney, Agent, or Firm* — Patrick J.S. Inouye; Krista A. Wittman (57) ABSTRACT

A computer-implemented system and method for computing summaries of securities order book information from trading venues is provided. Messages, which include order book market tick data for order books, are received at a market data analyzer computer from a producer. The producer includes an electronic trading venue or a market data consolidator. The order book market tick data is summarized on the market data analyzer computer by computing time weighted averages of a volume of securities available at average spreads as the order book market tick data messages are received. Messages, which include the summaries of the order book market tick data, are transmitted from the market data analyzer computer to one or more consumers at some sampling interval or triggered by some sampling event. The number of the messages transmitted from the market data analyzer computer is lower than the number of messages received from the producer.

18 Claims, 7 Drawing Sheets

(56) References Cited

OTHER PUBLICATIONS

"ExperTelligence, Inc. Launches 3DStockCharts.com; 3DStockCharts.com is Incorporated as Subsidiary with Investor Cash Fusion", PR Newswire [New York], Oct 21, 1999, pp. 1-2.*

Anonymous, "Aleri Inc; ITG Deploys Aleri CEP Technology for Market Data Consolidation", Investment Weekly News, Oct 24, 2009, p. 94.*

"Exegy Ticker Plant 2.0 Introduces First Hardware-Accelarated Ticker Plant for Order Book Data", PR Newswire, Sep. 12, 2007, pp. 1-2.*

* cited by examiner

COMPUTER-IMPLEMENTED SYSTEM AND METHOD FOR PROVIDING SUMMARIZATION OF SPREAD AND VOLUME FOR SECURITIES ORDER BOOKS

FIELD

This application relates in general to the computerized analysis of securities order book data and, in particular, to a computer-implemented system and method for providing summarization of spread and volume for securities order books.

BACKGROUND

Broad classes of securities are traded in public markets. Securities traders wishing to buy or sell these securities often have the option to place a limit order to buy or sell a number or volume of a security at a specified price.

Typically, electronic trading venues (markets) automatically organize these limit orders by price, order of arrival, and possibly volume into an order book for securities traders wishing to buy (bid) or sell (ask or offer). Each time there is a change in the order book, the electronic trading venue transmits a market data message to the traders describing the nature of the change. Some examples of possible messages include refresh, giving initial state information for the order book; an insert, where a new limit order is placed on the book; an update, where the price and volume of the limit order can change; and a delete, where a limit order is removed from the book. Other kinds of messages are possible.

When given security may be traded on two or more public trading venues, a common practice in the securities trading industry is to create a consolidated order book from the individual order books of two or more public trading venues. Another common practice is to automatically compute and electronically distribute the best bid and offer (BBO) and the price at the midpoint between the best bid and the best offer for an order book. These calculations can be done on the order books of individual electronic trading venues or for an order book consolidated across multiple electronic trading venues.

Using an order book, the electronic trading venues automatically match or cross orders with matching or crossing prices of buyers (bid) and sellers (ask) for new or updated limit orders. Further, market orders, or other orders requiring immediate execution, are filled by matching full or partial limit orders until the required volume is reached in a process known as "walking the book." In some cases, the electronic trading venues are required to match orders based on a consolidated order book of all venues listing a particular security.

As a result of the high volume of trading activity, the transmission rate of the market data messages generated by the multiple trading venues, with each of the electronic trading venues listing and trading many securities, can be quite large. For some classes of securities, order book market data message rates of several million messages per second are not uncommon.

This high message rate can present significant problems for electronic or automated securities trading organizations that wish to receive and analyze order book market data. Receiving and processing this massive volume of data with limited added time latency requires both high network bandwidth and a large amounts of computing capability. Moreover, the investments required to create and maintain this infrastructure is often impractical for many trading organizations. Conventional approaches fail to adequately resolve these data messaging and processing problems.

For instance, according to U.S. Patent Application Publication No. 2006/0253377, published Nov. 9, 2006, to Burns et al., discloses a trading system for hosting one or more electronic exchanges. The trading system receives bids to purchase and offers to sell from traders a tradeable object, which is listed at one of the electronic exchanges. The trading system further includes a data line that is used to carry order book information from the electronic exchanges, which is analyzed to find the best pricing and to automatically route trading orders.

U.S. Patent App. Pub. 2007/0038543, published Feb. 15, 2007, to Weinstein, discloses a system and method for managing financial market information. A processor is capable of generating a graphical depiction of the financial market information on a display. The graphical depiction includes a multidimensional representation of a broad range of market information for at least two financial instruments. The financial instruments may include multiple different classes of financial instruments, such as treasuries and futures. Different instruments may be selected and information, including basis information, relevant to the selected instruments may be displayed in a second window.

U.S. Patent App. Pub. 2007/0150407, published Jun. 28, 2007, to Gilboy, discloses a method and product for efficiently and intuitively placing a trade order through an order book display having an order display component and a market order book display component. The method includes dynamically displaying market information in the market order book display component, dynamically displaying order information in the order display component, placing an order by mobbing the order from the order display component into the market order book display component, and executing the order by releasing the order into the market order book display component.

U.S. Patent App. Pub. 2007/0294162, published Dec. 20, 2007, to Borkovec, discloses a system and method for allowing market participants to evaluate the likelihood of finding hidden trading volume. The model can predict hidden volume and assess the probability that a market order will be executed within the spread and better than the mid-quote. The cost per immediate execution can be assessed. Additionally, the best bid and offer prices from one or more trading venues are summarized and graphically displayed.

U.S. Patent App. Pub. 2009/0259598, published Oct. 15, 2009, to Stevens et al., discloses consolidated order book and market depth information from multiple fragmented markets, which includes a graphical representation of market depth and price points, balance, liquidity and volume-weighted average price for tradeable objects. The approach to computing the depth of an order book is extended to include computing and displaying a curve showing the average volume weighted quoted price on a plot with price on one axis and volume on the other axis.

Accordingly, a need remains for an approach to determining summary statistics for order books, which can facilitate efficient transmission of order book data in data messages over an electronic data network by lowering the number of messages transmitted.

SUMMARY

Summary statistics for securities order book state are automatically computed using a computer connected to one or more networks. The raw real time order book market tick data, or level 2 data, is received by the computer over the networks from one or more electronic public securities trading venues or third party data consolidators. The computer aggregates the raw order book data and computes one or more types of summary statistics from the data using causal time series operators.

These summary statistics are then periodically transmitted to one or more consumers with a reduced message rate. The number of the messages transmitted from the market data analyzer computer is lower than the number of messages received from the producer. The message rate reductions can be on the order of anywhere from tens to thousands or more to one, that is, 10:1, 1000:1, and so forth, depending upon the time interval between summary updates and the raw message rate. The reduced message rate allows electronic trading organizations to more effectively and economically use the order book information, without the need to process the large numbers of raw order book market data messages.

In some cases, the computer creates and maintains the order books for one or more trading venues, using the order book market data supplied by these venues or third party market data consolidators. Also, in some cases, the computer can optionally create and maintain a consolidated order book across two or more public venues. As one alternative, order books created and maintained by trading venues or third party market data consolidators may be aggregated.

From the raw order book information, summaries of the state of each order book of interest are automatically computed. These computations are updated whenever a new raw order book market tick data message is received.

By way of example, the state of an order book by can be summarized by one or more of the following methodologies:
- computing the total volume or volumes of a security, which are available within a given average spread or spreads from the midpoint price,
- computing the average spread or spreads from the midpoint price for one or more predetermined volumes of a security,
- computing measures of the asymmetry in volume at one or more spreads or spreads from the midpoint price at one or more volumes,
- computing summaries of order characteristics, such as mean or median lifetime, the mean or median number or orders, and mean or median size of the orders including the volume at a given average spread or the spread at a specified volume, and
- computing the volatility or other measure of variability in volume at one or more average spreads from the midpoint price at one or more spreads at one or more volumes.

These and other summaries can be computed using any one of a number of causal time series operators. In one embodiment, time weighted moving averages are used to compute the aforementioned summary statistics. These time weighted moving averages can be updated when each new order book market data message is received. For example, an exponential weighted moving average is used to compute the time weighted average of the summary statistics.

Summary statistics for the order book are computed or updated as the real time order book market data messages are received. Thereafter, the statistics are sampled in time and transmitted in messages over an electronic data network to one or more consumers. The sampling time period can be determined in several possible ways. The snapshots can be transmitted at regular time intervals. In another example, an order book state summary message can be sent whenever some statistic, such as the price at the midpoint between the best bid and best ask, changes. Alternatively, a summary message can be transmitted when requested or queried by a consumer. This sampling process effectively provides a snapshot of the time weighted moving averages of the order book summary statistics, representing the state of the order book at a reduced message rate when compared to the message rate of the raw order book market tick data. The reduced message rate enables consumers to more easily process the order book state information.

The consumers can be, for example, an order management system, execution management system, pre and post-trade analysis system, computers implementing an order routing algorithms and other algorithmic trading, and risk management system. Consumers receiving the order book summary statistics can use the data in a number of ways. For example, the summaries of the depth of book can be used by consumers to make pre-trade analyses of market impact or risk of poor execution for a proposed trading strategy, or the summaries can be used to measure post-trade execution effectiveness. As another example, consumers can use the order book summary information to optimize the scheduling of a large securities trade block broken into relatively small increments.

In one embodiment, alerts can be generated from the order book summary statistics. These alert conditions are distributed to one or more consumers. Some examples of alerts that can be generated and distributed include:
- indications that the total volume or volumes of a security, which are available at one or more average spread or spreads from the midpoint price, has dropped below some critical level,
- indications that the average spread or spreads from the midpoint price for one or more predetermined volumes of a security have risen to critical level or that the desired volume of securities are simply not available,
- indications that the asymmetry in volume at one or more spreads or spreads from the midpoint price or of the spread at one or more volumes has risen to a critical level indicating a significant imbalance in order book or order books,
- indications that the time weighted averages of order size, number of orders, or lifetime of orders at one or more volumes are outside of a desirable range, and
- indications that the volatility or other measure of variability in volume at one or more average spreads from the midpoint price at one or more spreads at the average spread at one or more predetermined volumes grows past some critical level.

Upon receiving these alerts, consumers may take several possible actions. A trading algorithm may either cease operation if the alerts identify undesirable market conditions, or may change its mode of operation to better accommodate the market conditions. As another example, a trade scheduling algorithm might recompute a trade schedule based on the new market conditions.

One embodiment provides a computer-implemented system and method for automatically computing summaries of securities order book information from one or more trading venues. Messages, which include order book market tick data for a plurality of order books, are received at a market data analyzer computer from a producer. The producer includes at least one of an electronic trading venue and a market data consolidator. The order book market tick data is summarized on the market data analyzer computer by computing a volume of securities available at a plurality of average spreads from the order book market tick data. The order book summaries are computed using time weighted moving averages, which are updated upon the arrival of each order book market data message. The order book summaries are sampled in time. Messages containing the sampled order book summary information are transmitted from the market data analyzer computer to one or more consumers. The number of the messages transmitted from the market data analyzer computer is lower than the number of messages received from the producer.

A further embodiment provides a computer-implemented system and method for automatically computing summaries of securities order book information from one or more trading venues. A market data analyzer computer is connected to one or more networks, which are used to transmit order book market tick data between producers that include electronic trading venues and market data consolidators. Average spreads for the order book market tick data are computed at a plurality of selected volumes of securities on the market data analyzer computer. The order book summaries are computed using time weighted moving averages, which are updated upon the arrival of each order book market data message. The order book summaries are sampled in time. Messages containing the sampled order book summary information are transmitted from the market data analyzer computer to one or more consumers. The number of the messages transmitted from the market data analyzer computer is lower than the number of messages received from the producers.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

Figure 1:
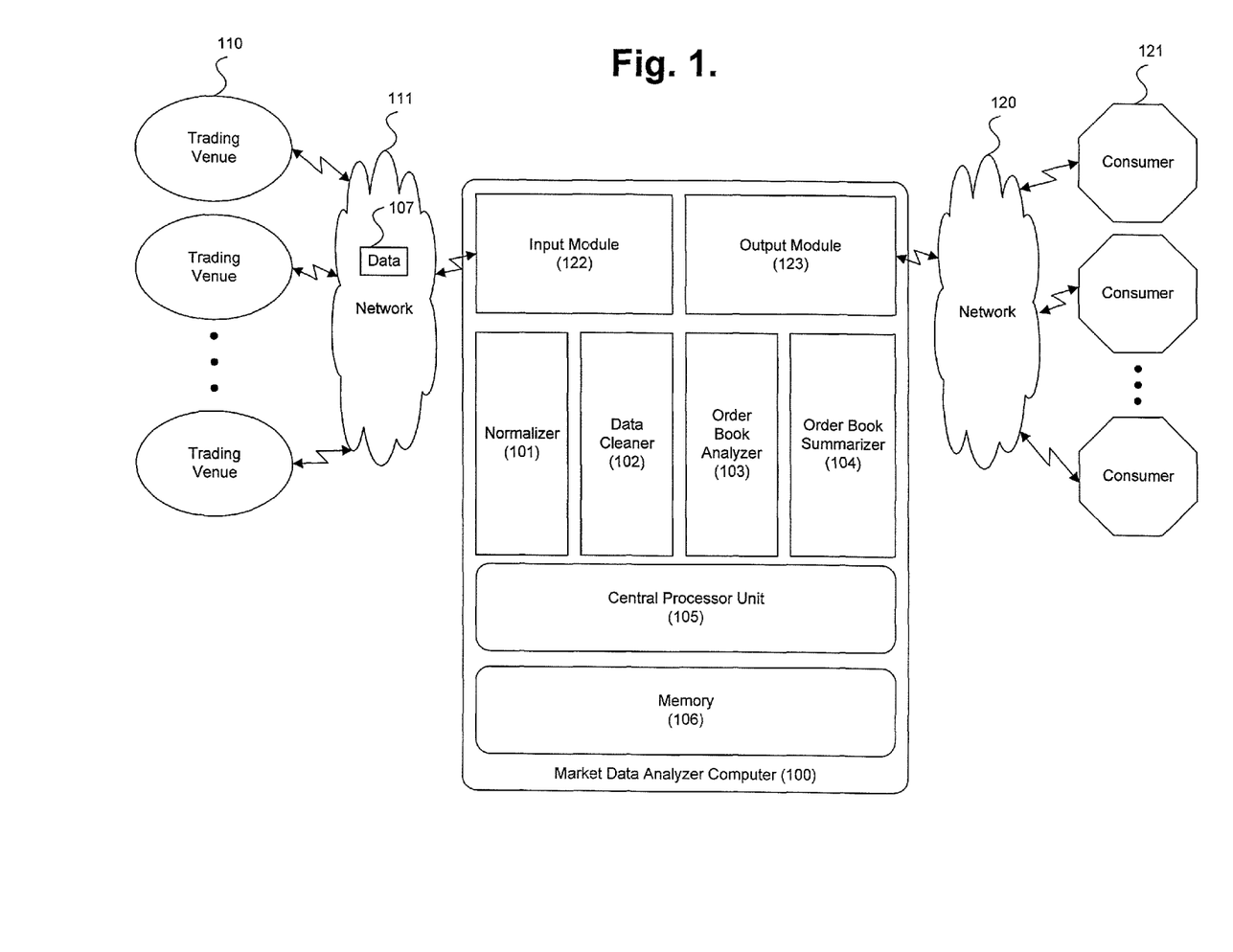
FIG. 1 is a block diagram showing a computer-implemented system used to automatically compute and distribute order book summary information, in accordance with one embodiment.

Summary statistics for securities order book state can be determined and distributed to facilitate efficient transmission and further processing of order book data in data messages over an electronic data network. FIG. 1 is a block diagram showing a computer-implemented system used to automatically compute and distribute order book summary information, in accordance with one embodiment. One or more producers, which include trading venues 110, transmit securities order book data 107 over one or more networks 111 to the market data analyzer computer 100. The securities order book data 107 is received by the market data analyzer computer 100 through an input module 122. The trading venues 110 are fully computer automated using one or more server computers, which are connected to one or more electronic data transmission networks 111. Each server computer includes hardware components conventionally found in a general purpose programmable computing device, such as a central processing unit 105, both volatile and nonvolatile memory 106, user interfacing means, such as a keyboard, mouse, and display, input/output ports, and network interface, and execute software programs structured into routines, functions, and modules for execution on the various systems. In addition, other configurations of computational resources, whether provided as a dedicated system or arranged in client-server or peer-to-peer topologies, and including unitary or distributed processing, communications, storage, and user interfacing, are possible. The market data analyzer computer 100 can be implemented on a single server. In further embodiments, the market data analyzer computer 100 can be implemented on one or more clusters of servers, either co-located at the same location or over geographically separated locations. In still further embodiments, the market data analyzer computer 100 can be implemented on cloud computing platforms and grid computing platforms, possibly provided by third parties.

In the following discussion, the function of the market data computer 100 and the processes contained therein are identical, regardless of whether the order book market data 107 comes directly from an electronic trading venue 110 or is processed by an intermediate market data consolidator. Thus, no distinction need be made between these two cases. Furthermore, other order book market data 107 sources are possible.

The market data analyzer computer 100 executes the processes to automatically analyze and summarize the securities order book data. These processes include a normalize 101, data cleaner 102, order book analyzer 103 and order book summarizer 104, the operations of which are further described below beginning with reference to FIG. 2. Other processes are possible.

The market data analyzer computer 100 distributes order book summary information to one or more consumers 121 over one or more data networks 120. The order book summary information is transmitted from the market data analyzer computer 100 through an output module 123. Crucially, the number of the messages transmitted to the consumers 121 from the market data analyzer computer 100 is lower than the number of messages received from the trading venues 110, who are the producers, as further described below with reference to the methods used to compute time weighted averages and sample the order book state summary information.

The one or more consumers 121 can be, for example, desktop trading screens, order management systems, execution management systems, pre and post-trade analysis systems, order routing algorithms and other trading algorithms, and risk management systems. Other consumers are possible. The one or more consumers 121 can be co-located with the market data analyzer computer 100, or distributed over one or more remote locations. The one or more consumers 121 could also be under the control of one or more securities trading business entities.

The one or more data transmission networks 111 and 120 may include data transmission equipment, switches, security devices and routers. The networks 111 and 120 may a single unified network or may be one or more different networks.

The detailed steps performed as part of the methodology described supra with reference to FIG. 1 will now be described.

Figure 2:
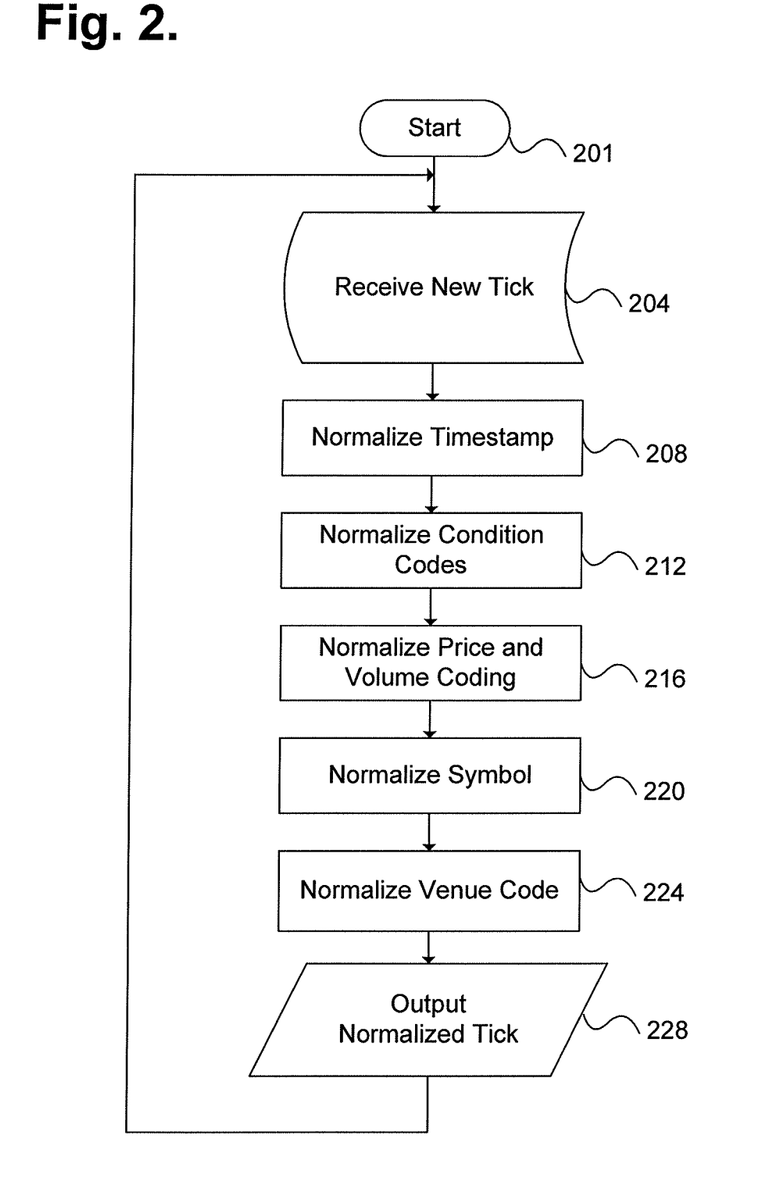
FIG. 2 is a flow diagram showing the operation of the automatic normalizer of FIG. 1.

New securities order book market data must first be normalized into a uniform format and encoding. FIG. 2 is a flow diagram showing the operation of the automatic normalizer 101 of FIG. 1. Initially, the normalizer 101 idles at the start 201 of operations until a new securities order book market data tick record is received 204, at which time the one or more time stamps are normalized 208. This normalization may include changing data representation formats and mapping between different global time zones. The normalization may include applying a clock-offset correction for the one or more trading venues 110. Security-specific and trading venue-specific normalizations 212 can be applied to condition codes. For example, order book data from a trading venue 110 where trading has been halted may be coded in a uniform manner. Coding of the price and volume may also be normalized 216. Such normalization may be required, for example, to compute a price or total volume from the specifications of a derivative security. In some cases, trading symbols produced by the different trading venues 110 may differ for the same security and will need to be normalized 220. Any other trading venue-specific coding may also need to be normalized 224. Finally, the normalizer 101 outputs the normalized tick record 228. The normalization processes discussed are identical if the data flows through third party market data consolidators. Other normalization processes are possible.

Figure 3A:
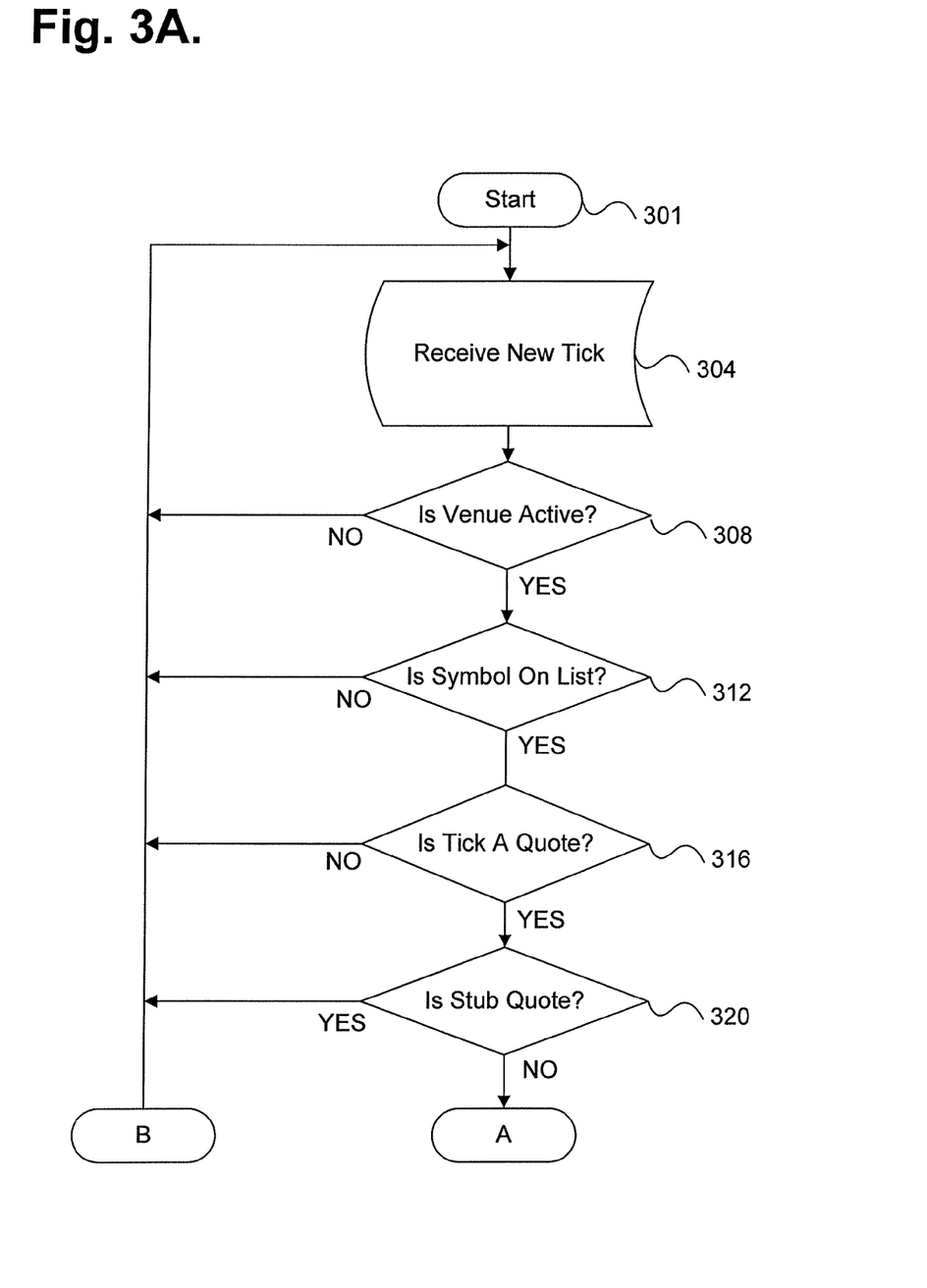
FIGS. 3A-B are flow diagrams showing the operation of the automatic data cleaner of FIG. 1.
Figure 3B:
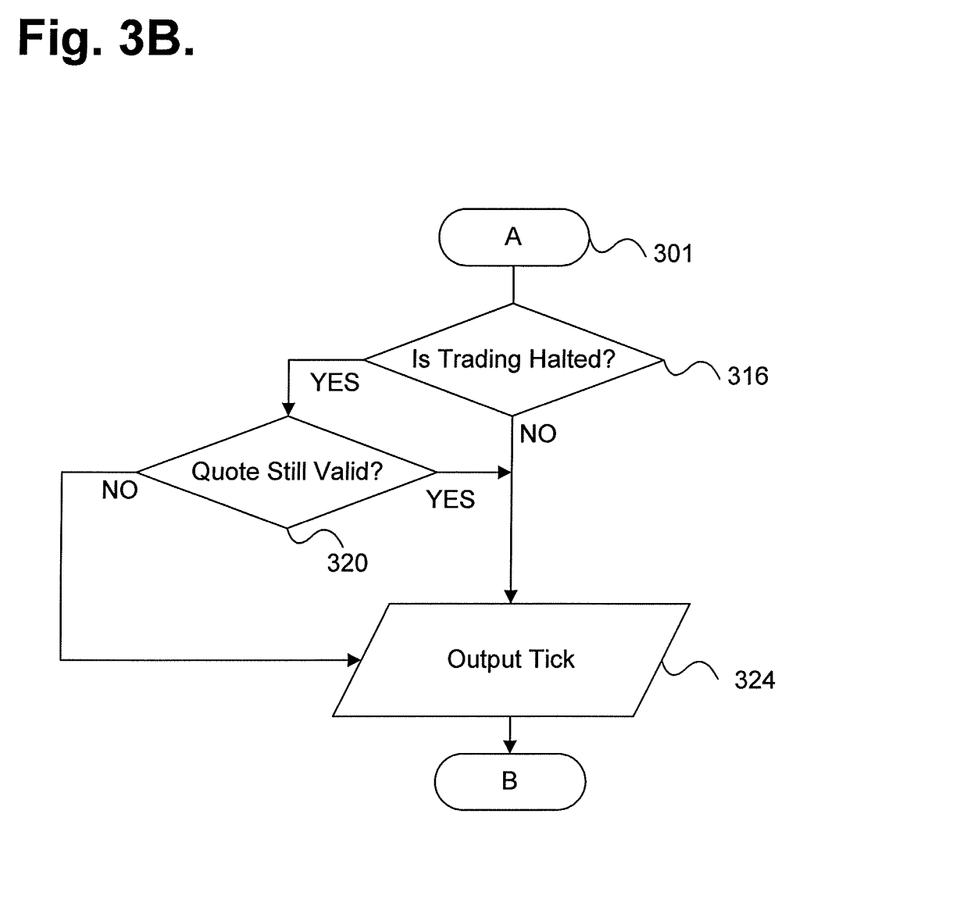

Preferably, erroneous, questionable, or otherwise unacceptable or unusable normalized data tick records should be filtered out of the summarization process. FIGS. 3A-B are flow diagrams showing the operation of the automatic data cleaner 102 of FIG. 1. Initially, the data cleaner 102 idles in the start 301 of operations until a new tick is received 304, possibly from the normalizer 101, although other sources of data tick records are possible. The data cleaner 102 may determine if a particular trading venue 110 is active at a particular time 308. For example, a financial calendar filter might be applied to determine if active trading is occurring on each trading venue 110. The order book tick record may be rejected 312 if the data is not on a list of security trading symbols of interest. Tick records which do not contain order book or quote information may be rejected 316 and not subject to further analysis. Additionally, quotes with values of dubious quality, such as a stub quote with a clearly erroneous price or extreme volume value, may be rejected 320 and not subject to further analysis. If trading in a security is halted 316 on one or more of the one or more trading venues 110, a decision may be made to reject that quote 320. Other filtering criteria are possible. Finally, an order book tick record that passes all filter criteria of the data cleaner 102 is output 324, possibly to the order book analyzer 103.

The following discussion illustrates the operation of the order book analyzer 103 and order book summarizer 104 for a single security traded on one or more electronic trading venues 110. The same process flow is simply replicated when order book information for two or more securities is to be summarized.

Figure 4:
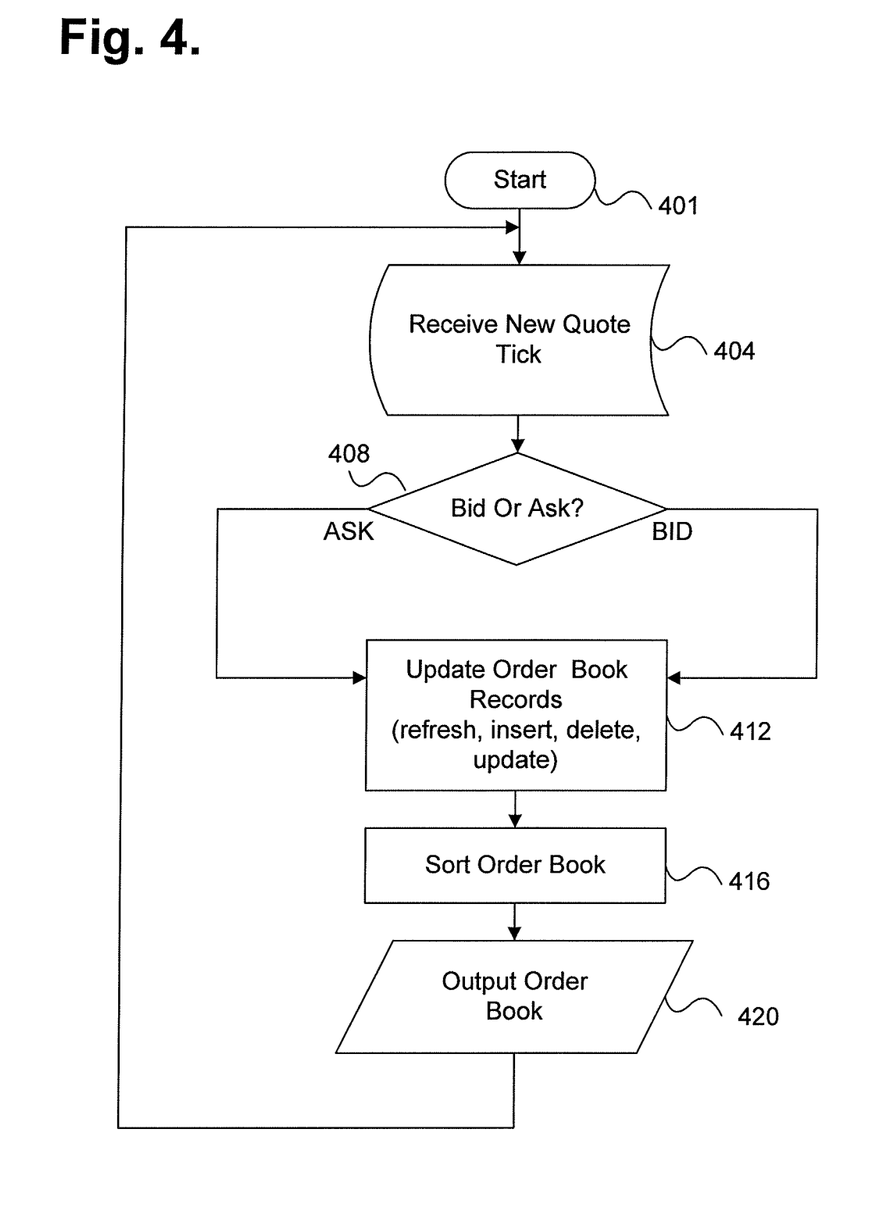
FIG. 4 is a flow diagram showing the operation of the automatic order book analyzer of FIG. 1.

FIG. 4 is a flow diagram showing the operation of the automatic order book analyzer 103 of FIG. 1, which may operate on the order book from a single electronic trading venue 110, or on an order book consolidated across one or more electronic trading venues 110. Initially, automatic order book analyzer 103 idles at the start 401 of operations until a new quote tick is received 404. The quote ticks are segregated, depending on if they contribute to the bid or ask (offer) outside of the order book 408. The order book state for the bid or the ask is then updated 412 based on the new market data. For example, quote messages may be of several types including, refresh, which sets a new state for the order book; an insert, which adds a new order to the book; a delete, which removes an order from the book; and an update, which changes the price or the volume of the order. The updated order book is then sorted 416 in price order. Finally, the updated order book information is output to, for example, the order book summarizer 104.

In some embodiments, the order book market data produced by one or more electronic trading venues may indicate the aggregated volume for all quotes at a plurality of prices. These market data are then used in the order book summary calculations discussed herein, and may be integrated with other order book market data from venues providing information on individual quotes.

Figure 5A:
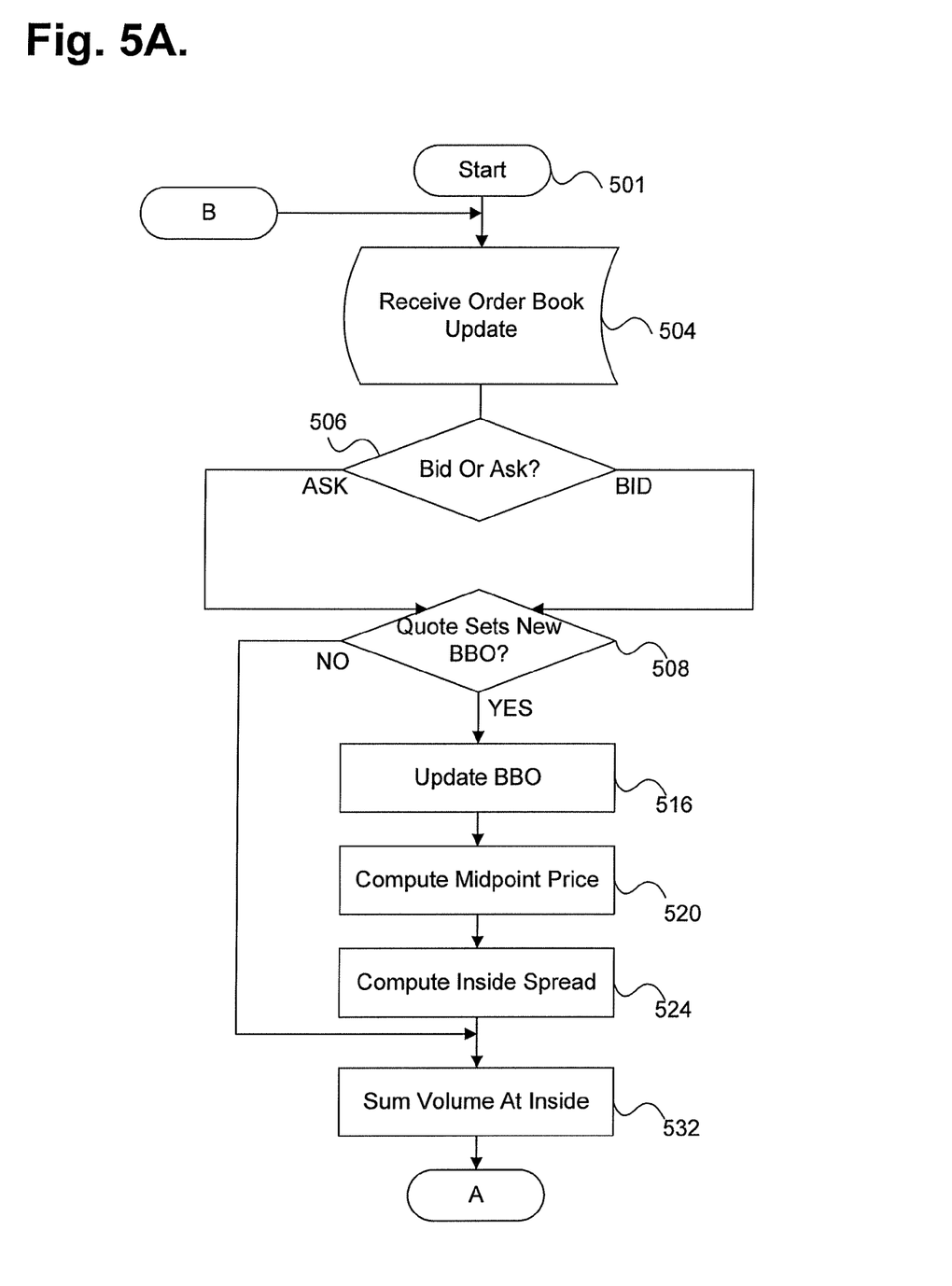
FIGS. 5A-B are flow diagrams showing the operation of the order book summarizer of FIG. 1.
Figure 5B:
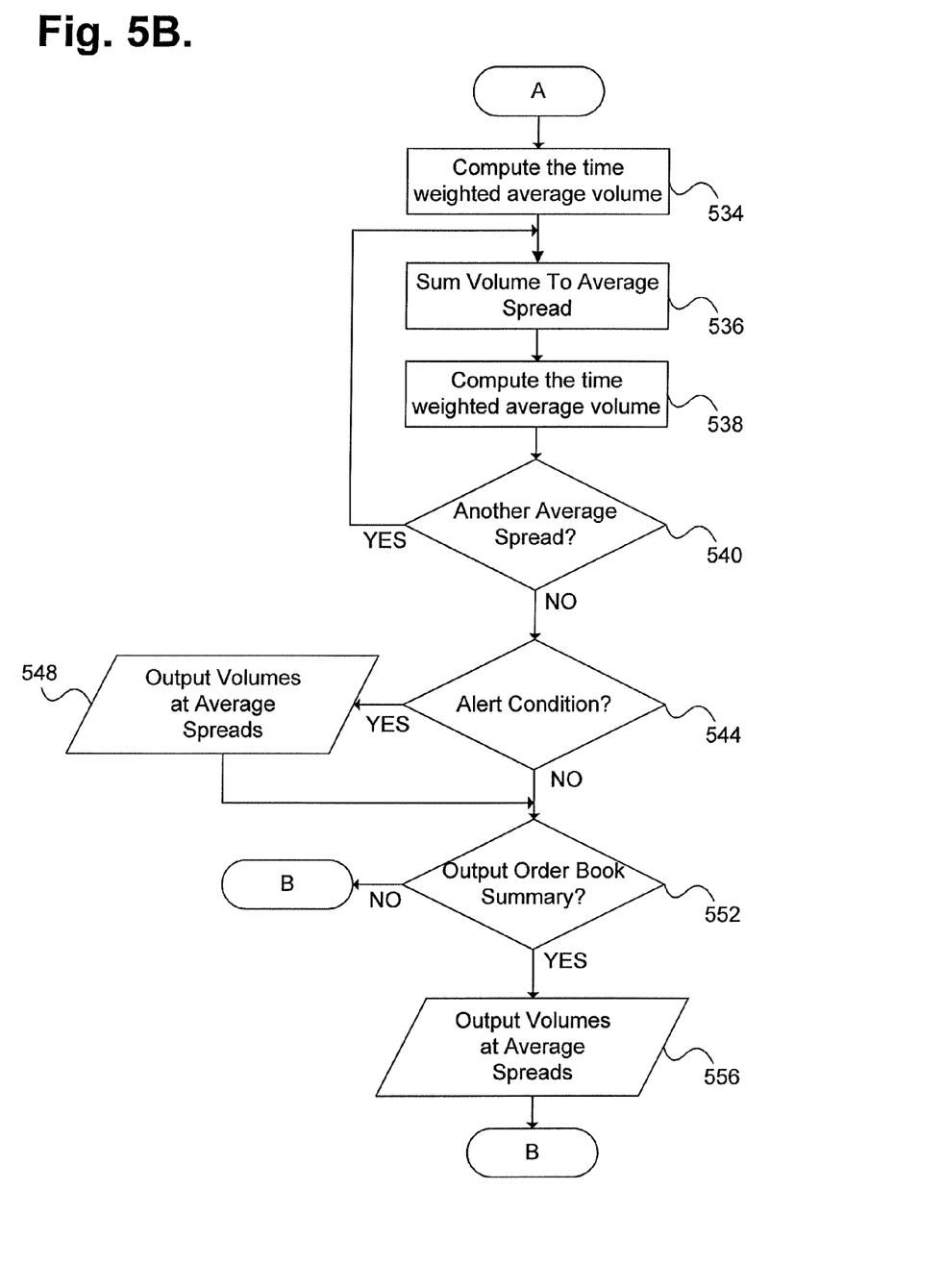

Following analysis, order book data is summarized. FIGS. 5A-B are flow diagrams showing the operation of the order book summarizer 104 of FIG. 1, which may operate on the order book from a single electronic trading venue 110, or on a order book consolidated across one or more electronic trading venues 110. Initially, the order book summarizer 104 idles at the start 501 of operations while waiting to receive order book update information 504. The order book summarizer 104 determines whether the new information pertains to the bid or ask side of the order book 506. If the new updated order book information contains a quote that sets a new best bid and offer (BBO) 508, the BBO is updated 516, the midpoint price is computed 520 and the inside spread between the best bid and best offer price is computed 524. The midpoint price is computed, even in cases when the market in a security is said to be locked, where the best bid and best offer are at the same price, or, in a crossed market, where the best bid is at a higher price than the best offer price, with these conditions typically occurring in consolidated order books. The volume for the bid and offer at the inside is then recomputed 532. In some cases, the BBO, the midpoint price, and the inside spread, and the volume at the best bid and best ask can be computed using a time weighted moving average, such as an exponential moving average. The time weighted moving averages of the volume at the best bid and best ask are updated 534.

The total volume at one or more average spreads over the inside spread is then computed 536. The average spread may be computed as the volume weighted average of the spreads of the individual orders on the book or of the aggregated orders at each price level. Alternatively, computations can be performed to determine the average spreads from the midpoint price at one or more volumes. Once the volume at a spread or the spread at a volume is computed, the time weighted moving average of this quantity is updated 538.

The time aggregation of the order book data can be computed with any one of many possible causal time series operators. For example, the time weighted moving averages 534, 538 can be computed in any of a number of ways. A causal kernel weighting operator can be applied to a moving time window of the order book summary statistics. This time weighting kernel can include equal weighting. As another example, an exponential weighted moving average with any of a wide range of decay constants may be used.

Additionally, the asymmetry and volatility, or other measure of variability, of the volume at the one or more spreads or asymmetry of the spread at one or more volumes can be computed.

In some cases, the asymmetry is normalized so that, for example, this measure can be compared from one time period to the next period or between the volumes and different spreads. An example of this normalization is to divide the difference between the volume at the ask side of the order book and the volume at the bid side of the order book by the sum of the volume at the bid and ask at a given average spread. This normalization has a range from 1.0, where all the volume at the given average spread is on the ask side of the book, to −1.0 where all of the volume is on the bid side. An asymmetry value of 0.0 indicates the volume is the same on each side of the book at the chosen average spread.

In some cases, the asymmetry and volatility, or other measure of variability, can be computed using a time weighted moving average, such as an exponential moving average.

In some cases, the average size of the orders, including the volume, the number of orders, including the volume, and the average life time of the orders, including the volume, may be computed. In some embodiments, this summary information may be computed using time weighted moving averages, including exponential weighted moving averages.

Once the weighted average of the volume is computed 538, the process is repeated 540 for any additional average spreads. Alternatively, additional average spreads at one or more volumes may be computed.

If one or more alert conditions are detected 544, one or more alert messages are transmitted 548.

Finally, if the conditions for outputting the order book state summary message has been met 552 the order book summary information is sampled and the data message is transmitted 556. The output from the order book summarizer 104 can be triggered in a number of ways, including, for example, at regular time intervals, when the raw order book market data from the one or more electronic trading venues sets a new midpoint price, or when queried by the one of more consumers. The sampling process of the weighted average of the order book state summary greatly reduces the message rate produced by the order book summarizer 104 when compared to the raw order book market data rate conventionally output from the one or more electronic trading venues 110. This reduction in message rate reduces the burden on the one or more consumers 121 processing order book information.

In some implementations, order book summaries for each trading venue are computed individually. The summaries of the consolidated or aggregated order book are computed from these individual order book summaries. Messages containing the summaries of both the individual and consolidated order books are output periodically. For example, the summaries of the individual order books may be computed at locations geographically close to the trading venues, while the computations for the consolidated order book may be done at yet some other location.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for automatically computing summaries of securities order book information from one or more trading venues, comprising:
a market data analyzer computer comprising a processor and memory within which code for execution by the processor is stored, comprising:
an input module configured to receive messages comprising order book market tick records for a plurality of order books from a producer, wherein the producer comprises at least one of an electronic trading venue and a market data consolidator;
an order book summarizer configured to summarize the order book market tick records comprising:
an averaging module configured to compute for each of the order books, an available number of a particular security over a spread of prices comprising a time weighted moving average of a volume of the security available at a plurality of average spreads greater than an inside spread by determining the volume of the security at one or more of the average spreads between a bid price and offer price for each volume; and
an updating module configured to update the time weighted moving averages when each order book market tick record message is received and to sample the summarized order book market tick records by selecting a portion of the time weighted moving averages; and
an output module configured to transmit to a consumer, the selected portion of the time weighted moving averages that are sampled from the summarized order book market tick records in a number of messages each comprising a snap shot of the time weighted moving averages that represents a state of the order book, such that the number of the messages transmitted from the market data analyzer computer is lower than the number of messages received from the producer.

2. A system according to claim 1, wherein information on the variability of the volume of securities available at the plurality of average spreads is included with the summaries of the order book market tick records.

3. A system according to claim 1, wherein information on the normalized asymmetry of the volume available between bids and offers at the plurality of average spreads is included with the summaries of the order book market tick records.

4. A system according to claim 1, wherein summary information on any of the size, number of orders and lifetime of orders comprising the time weighted average of a volume of securities available at the plurality of average spreads is included with the summaries of the order book market tick records.

5. A system according to claim 1, further comprising:
a summarizer module configured to use an exponential weighted moving average method to compute the time weighted summaries of the order book market tick records.

6. A system according to claim 1, wherein the consumers represent two or more unrelated business entities.

7. A computer-implemented method for automatically computing summaries of securities order book information from one or more trading venues, comprising:
receiving at a market data analyzer computer messages comprising order book market tick records for a plurality of order books from a producer, wherein the producer comprises at least one of an electronic trading venue and a market data consolidator;
summarizing the order book market tick records, comprising:
computing on the market data analyzer computer, for each of the order books, an available number of a particular security over a spread of prices comprising a time weighted moving average of a volume of the security available at a plurality of average spreads greater than an inside spread;
and
updating the time weighted moving averages each time an order book market tick record message is received;
sampling the summarized order book market tick records by selecting a portion of the time weighted moving averages; and
transmitting to a consumer, the selected portion of the time weighted moving averages that are sampled from the summarized order book market tick records in a number of messages each comprising a snap shot of the time weighted moving averages that represents a state of the order book, such that the number of the messages transmitted from the market data analyzer computer is lower than the number of messages received from the producer.

8. A method according to claim 7, further comprising: including information on the variability of the volume of securities available at the plurality of average spreads with the summaries of the order book market tick records.

9. A method according to claim 7, further comprising: including information on the normalized asymmetry of the volume available between bids and offers at the plurality of average spreads with the summaries of the order book market tick records.

10. A method according to claim 7, wherein summary information on any of the size, number of orders, and lifetime of orders comprising the volume of securities available at the plurality of average spreads is included with the summaries of the order book market tick records.

11. A method according to claim 7, further comprising: using an exponential weighted moving average method to compute the time weighted summaries of the order book market tick records.

12. A method according to claim 7, wherein the consumers represent two or more unrelated business entities.

13. A non-transitory computer-readable storage medium comprising code for automatically computing summaries of securities order book information from one or more trading venues, the code comprising:
    code for connecting a market data analyzer computer to one or more networks, which are used to transmit order book market tick records between producers comprising electronic trading venues and market data consolidators;
    code for summarizing the order book market tick records by computing an available number of a security over a spread of prices comprising a time weighted average of a volume of the security available at a plurality of average spreads greater than an inside spread for the order book market tick records;
    code for updating the time weighted average when each order book market tick record message is received and for sampling the summarized order book market tick records by selecting a portion of the time weighted averages;
    and
    code for transmitting to a consumer, the selected portion of the time weighted averages that are sampled from the summarized order book market tick records in a number of messages each comprising a snap shot of the time weighted moving averages that represents a state of the order book, wherein the number of the messages transmitted from the market data analyzer computer is lower than the number of messages received from the producers.

14. A non-transitory computer readable medium according to claim 13, further comprising:
    code for including information on expected variability of the average spreads at the plurality of the selected volumes of the securities with the summaries of the order book market tick data.

15. A non-transitory computer readable medium according to claim 13, further comprising:
    code for including information on normalized asymmetry of the average spread at the selected volumes of the securities with the summaries of the order book market tick records.

16. A non-transitory computer readable medium according to claim 13, wherein summary information on any of the size, number of orders, and lifetime of orders comprising the volume of securities available at the plurality of average spreads is included with the summaries of the order book market tick records.

17. A non-transitory computer readable medium according to claim 13, further comprising:
    code for determining the time weighted average summaries of the order book market tick data using an exponentially weighted moving average.

18. A non-transitory computer readable medium according to claim 13, wherein the consumers represent two or more unrelated business entities.

\* \* \* \* \*